United States Patent
Davis et al.

(10) Patent No.: US 7,254,654 B1
(45) Date of Patent: Aug. 7, 2007

(54) SPLIT-FIFO MULTI-STATION DATA TRANSFER SYSTEM

(75) Inventors: Almir Davis, Quincy, MA (US); Christopher S. MacLellan, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 541 days.

(21) Appl. No.: 10/813,989

(22) Filed: Apr. 1, 2004

(51) Int. Cl.
*G06F 3/00* (2006.01)

(52) U.S. Cl. .................. 710/52; 710/53; 710/54; 710/56; 710/5; 710/20; 710/21

(58) Field of Classification Search .......... 710/5, 710/20, 21, 52–57
See application file for complete search history.

(56) References Cited

U.S. PATENT DOCUMENTS

| 5,214,760 A | * | 5/1993 | Hammond et al. ........... 710/52 |
| 6,553,450 B1 | * | 4/2003 | Dodd et al. ................. 711/105 |
| 6,725,306 B2 | * | 4/2004 | Stuber et al. ............... 710/107 |

\* cited by examiner

*Primary Examiner*—Alan S. Chen
(74) *Attorney, Agent, or Firm*—Krishnendu Gupta; Scott A. Ouellette

(57) ABSTRACT

A data transfer device is disclosed for writing data to and reading data from a disk drive system through a plurality of ports of the data transfer device. The data transfer device includes a first buffer for serially receiving, from a host system, control portions of data read requests and data write transfers; a second buffer for serially receiving, from the host system, data portions of data write transfers received by the first buffer; and N temporary storage devices, wherein N is a positive integer, coupled to the first buffer and the second buffer, the N temporary storage devices for parallelly receiving and temporarily storing consecutive control portions of the data read transfers and data write transfers from the first buffer. Up to N of the data read transfers and data write transfers are transferred to the disk drive system through the plurality of ports simultaneously.

10 Claims, 5 Drawing Sheets

SPLIT-FIFO MULTI-STATION DATA TRANSFER SYSTEM

FIELD OF THE INVENTION

The present invention is directed generally to a split-FIFO multi-station data transfer system and, more particularly, to a data transfer system that processes data read requests and data write requests in a parallel manner, in order to increase the throughput of the data transfer system.

BACKGROUND OF THE INVENTION

FIG. 1 is a schematic diagram of a known data transfer system 100. Data transfer system 100 includes a data link 102 which receives data read transfers and data write transfers from a host (not shown) and transfers the data read transfers and data write transfers to a disk drive system (not shown) through a multi-port access architecture 104 for the purpose of reading data from and writing data to the disk drive system. Data transfer system 100 includes a FIFO buffer 106 which receives the data read transfers and data write transfers from the data link 102, and an output register 108, which is controlled by output register controller 110.

In operation, in the example shown in FIG. 1, a data write transfers 112, including a header "WRITE" and the data to be written, DATA1-DATA8, are input to the FIFO buffer 106 through the data link 102. Several data read transfers, "READ" 114, are then input to the FIFO buffer 106. Each data transfer is transferred to the output register 108 in the order that it was received by the FIFO buffer 106. The output register 108 processes each data transfer and transfers each data transfers to the proper port, as indicated in the header associated with the data transfer. The output register 108 processes the data read and write transfers one at a time as it transfers each through to the multi-port access architecture 104.

Although the combination of the single FIFO buffer 106 and the output register 108 are suitable for use with low-traffic systems, it becomes limited as the data traffic increases. Since the single FIFO buffer 106 and the output register 108 can process only one data transfer at a time, if a particular transfer cannot be completed because the client, or disk drive, to which the data transfer is directed, or the port through which the transfer is to occur, is not able to process the request, or takes a longer time than expected to process the request, the data transfer system stalls. No further transfers can be processed because the output register 108 holds the current data transfer until it can be processed, thus preventing subsequent transfers from being processed. The FIFO buffer 106 is still able to receive incoming data read and write requests from the data link 102, but the data requests in the FIFO buffer will remain backlogged until the data transfer in the output register 108 is processed. In the example shown in FIG. 1, if the data write transfer 112 is not able to be processed by the disk drive system coupled to multi-port access architecture 104, none of the data read requests 114 that follow the data write request 112 in the FIFO buffer 106 will be able to be processed until the data write request is processed. This can severely impede the operation of the data transfer system.

SUMMARY OF THE INVENTION

The present invention is directed to a data transfer system including a first FIFO buffer that receives the control portions of data transfers from the data link and a second FIFO buffer that receives the data portion of data write transfers from the data link. Each control portion of the data transfers is shifted into one of a plurality of parallel data stations, so that multiple data transfers can be processed simultaneously. The data portions of data write transfers are transferred through the station in which the associated data write transfer control portion is processed, when that data write transfer is processed. As soon as a station becomes available after a data transfer has been processed through the station, the next data transfer control portion in the first FIFO buffer is transferred to that station for processing.

According to a first aspect, a data transfer device is disclosed for writing data to and reading data from a disk drive system through a plurality of ports of the data transfer device. The data transfer device includes a first buffer for serially receiving, from a host system, control portions of data read transfers and data write transfers; a second buffer for serially receiving, from the host system, data portions of data write transfers received by the first register; and N temporary storage devices, wherein N is a positive integer greater than 1, coupled to the first register and the second register, the N temporary storage devices for parallelly receiving and temporarily storing consecutive control portions of the data read transfers and data write transfers from the first register. Up to N of the data read transfers and data write transfers are transferred to the disk drive system through the plurality of ports simultaneously.

The first and second buffers may be FIFO buffers. After each of the N temporary storage devices transfers a current data read transfer or data write transfer, a subsequent one of a data read transfer and data write transfer is transferred to each of the N temporary storage devices from the first buffer.

According to another aspect, a data transfer device for writing data to and reading data from a disk drive system includes a first buffer for serially receiving, from a host system, control portions of data transfer transfers; a second buffer for serially receiving, from the host system, data portions of data write transfers received by the first register; and N data transfer processing stations, coupled to the first buffer and the second buffer, the N data transfer processing stations for parallelly receiving and processing consecutive control portions of the data transfers from the first buffer. Up to N of the data transfers are simultaneously processed by the data transfer processing stations.

Data portions of data transfers queued in the second buffer may be shifted out of the second buffer and written to a disk drive of the disk drive system upon its associated control portion being processed by one of the N data transfer processing stations. Data portions of data transfers queued in the second buffer may be shifted from the second buffer to the data transfer processing station processing its associated control portion and then written to a disk drive of the disk drive system.

According to another aspect, a method of transferring data in a disk drive system includes:

A. receiving data transfers from a host system;

B. queuing control portions of the data transfers in a first buffer;

C. queuing data portions of the data transfers in a second buffer;

D. shifting each of N control portions of the data transfers from the first buffer into one of N parallel data transfer stations;

E. processing the N control portions in the N parallel data transfer stations simultaneously; and F. shifting subsequent control portions of data transfers queued in the first buffer to ones of the N parallel data transfer stations that have completed a transfer of a previously stored control portion.

According to yet another aspect data transfer device includes:

means for receiving data transfers from a host system;

means for queuing control portions of the data transfers in a first buffer;

means for queuing data portions of the data transfers in a second buffer;

means for shifting each of N control portions of the data transfers from the first buffer into one of N parallel data transfer stations;

means for processing the N control portions in the N parallel data transfer stations simultaneously; and means for shifting subsequent control portions of data transfers queued in the first buffer to ones of the N parallel data transfer stations that have completed a transfer of a previously stored control portion.

BRIEF DESCRIPTION OF THE DRAWINGS

These and other features of the invention will become more readily apparent from the following detailed description when read together with the accompanying drawings, in which.

DETAILED DESCRIPTION

Figure 1:
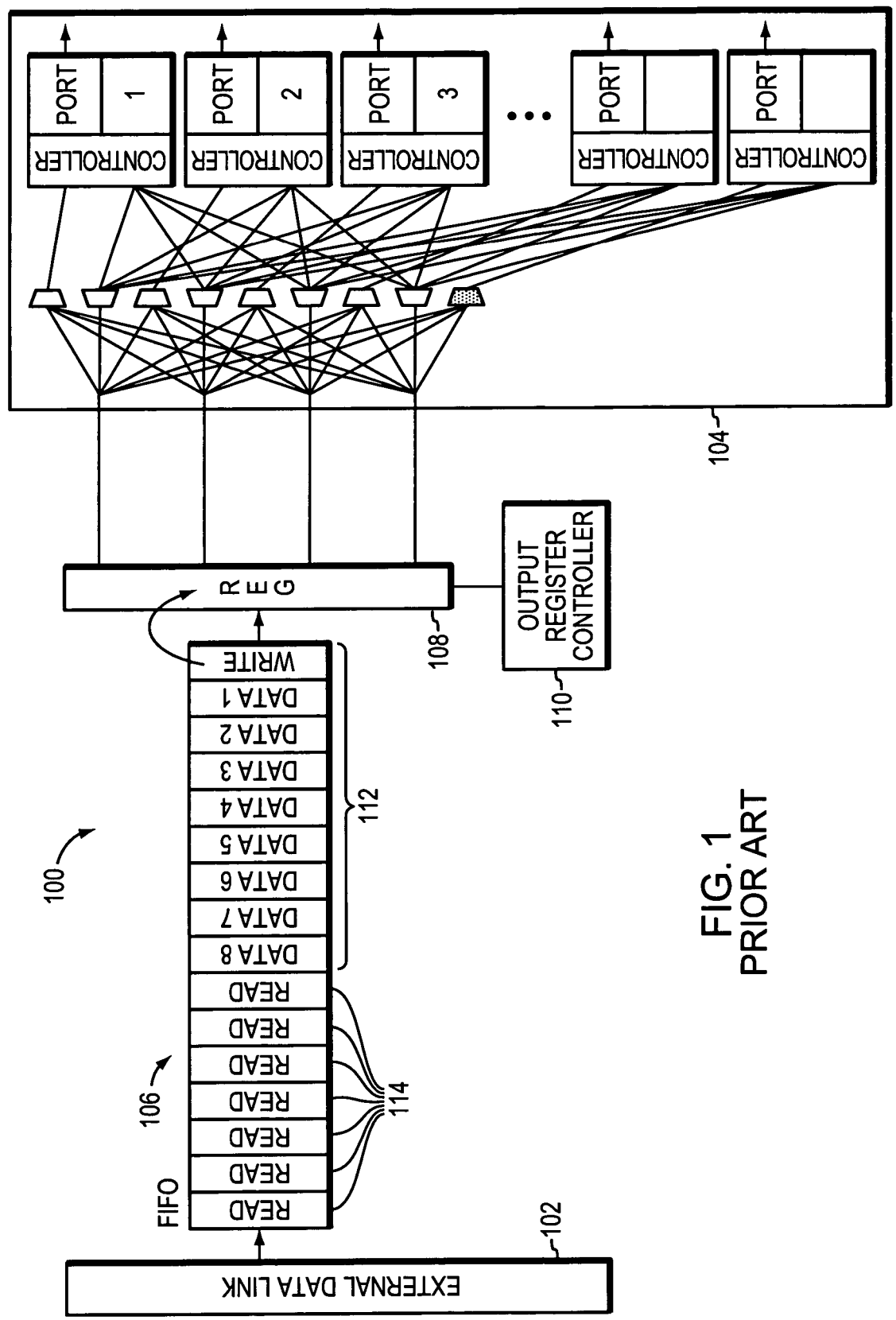
FIG. 1 is a schematic diagram of a prior art data transfer system.
Figure 2A:
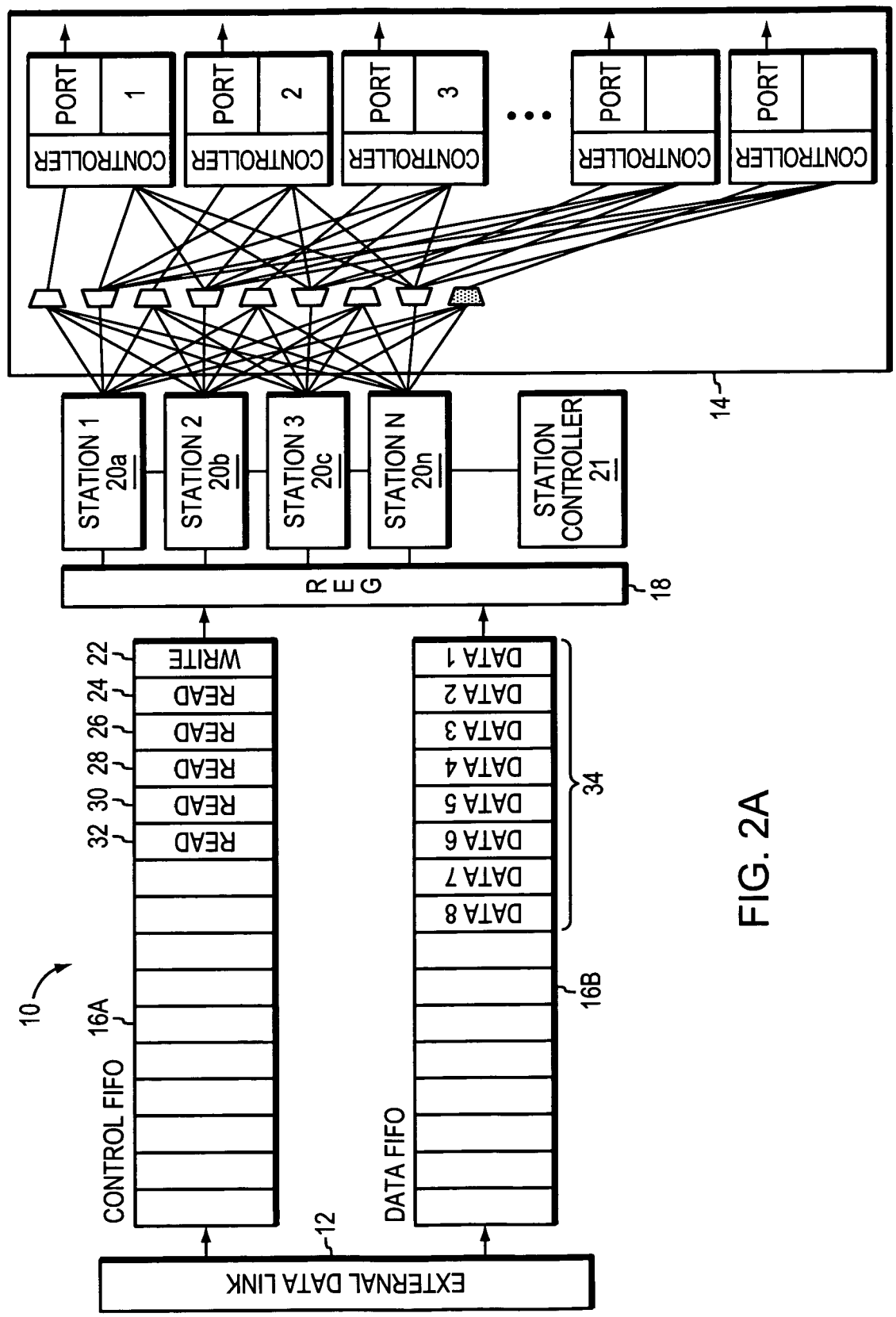
FIGS. 2A-2C are schematic diagrams of the data transfer system according to the present invention.
Figure 2B:
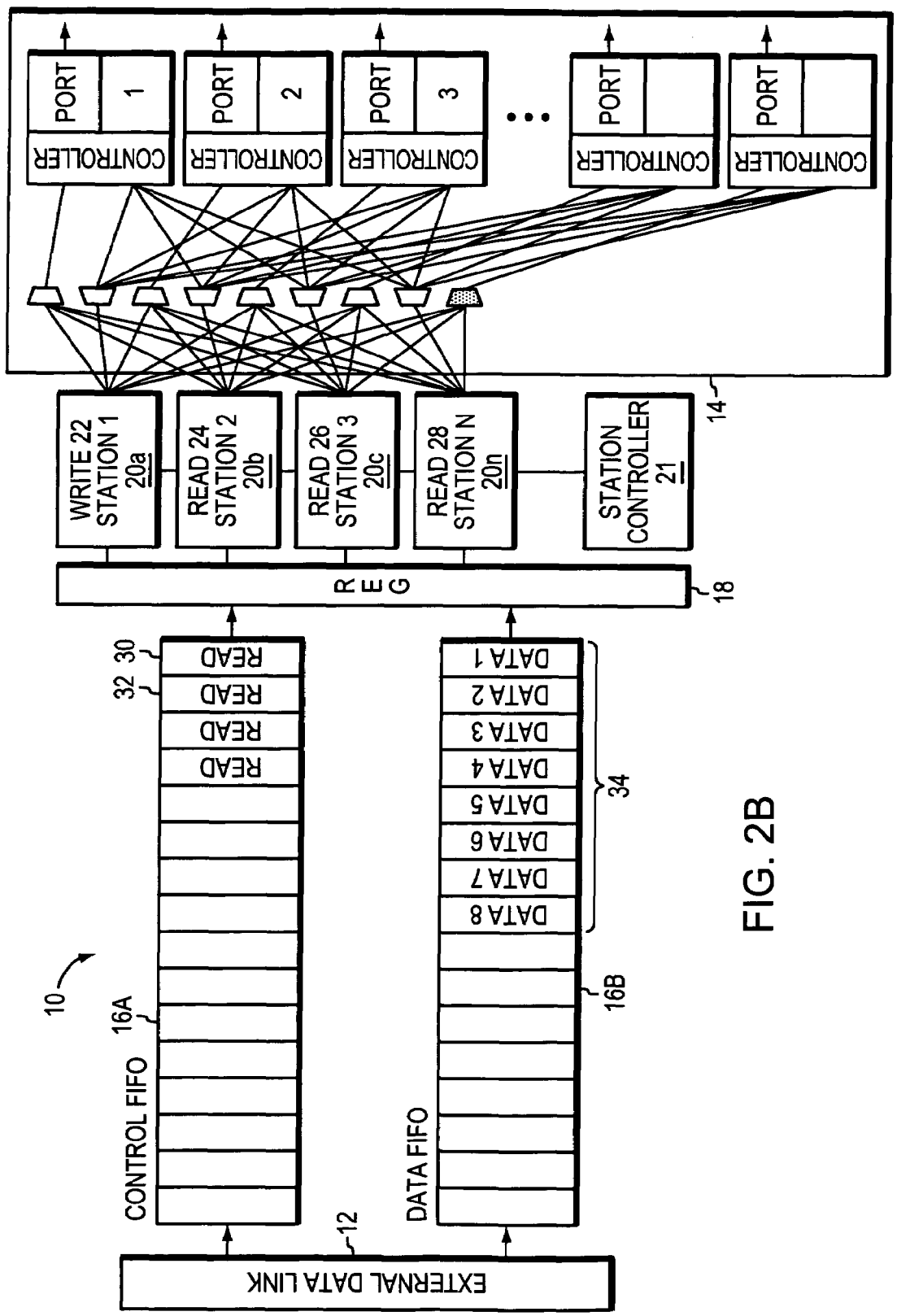
Figure 2C:
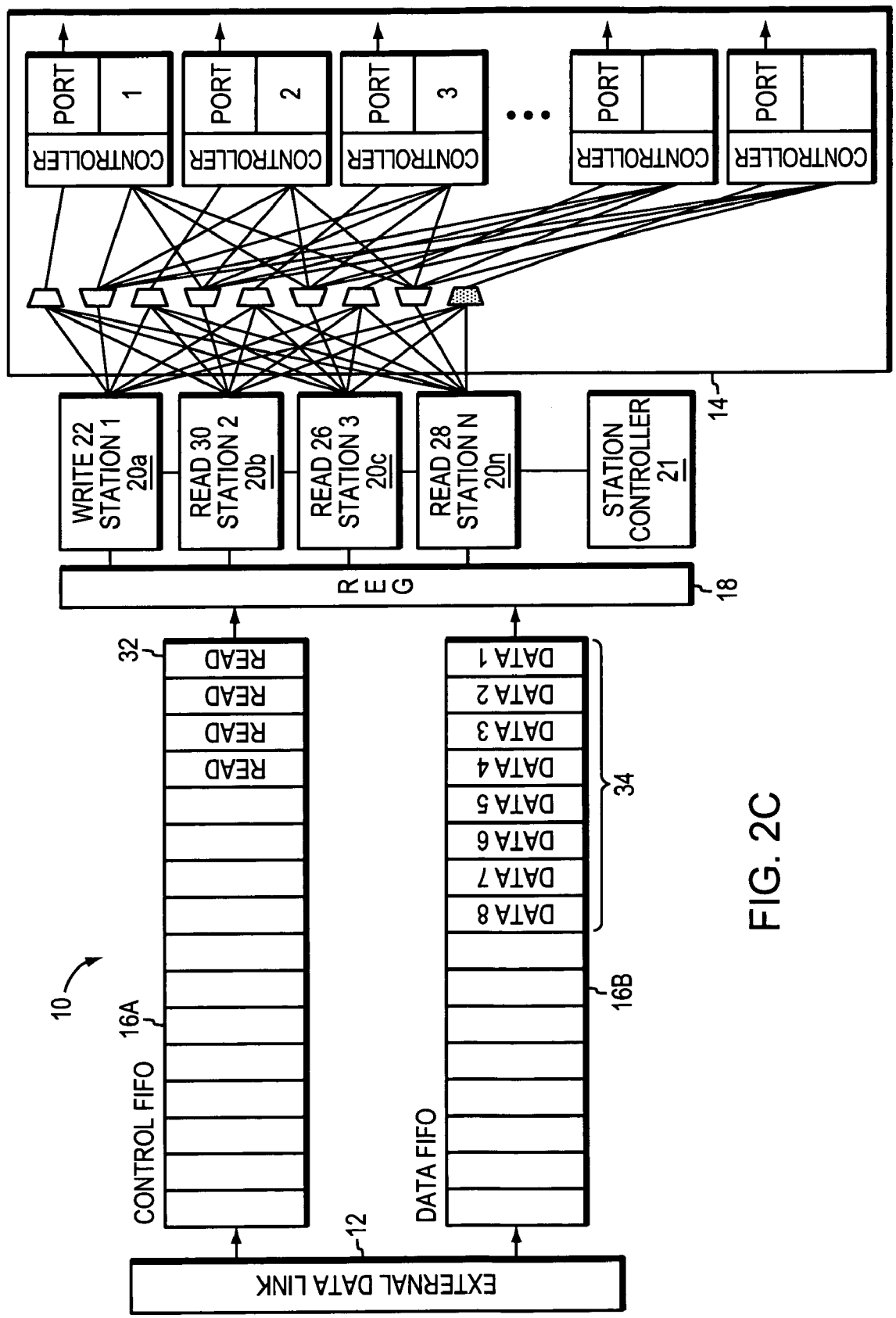

FIGS. 2A-2C are schematic diagrams of a data transfer system 10 in accordance with the present invention. Data transfer system 10 includes a control FIFO buffer 16A and a data FIFO buffer 16B, which are coupled to the data link 12 for receiving data read transfers and data write transfers from a host (not shown). Data request transfer system 10 further includes an output register 18 and a plurality of data transfer processing stations 20A-20N, which are controlled by a station controller 21. As described below, data request processing stations 20A-20N are configured to temporarily store and then transfer data transfers to the appropriate disk drive (not shown) through a multi-port access architecture 14. In one embodiment, data transfer processing stations 20A-20N each include a register that is capable of temporarily storing the read and write transfer control portions or headers, which are typically on the order of one 32-bit word. However, it will be understood that the size of the header is not critical to the invention, and that any size header can be accommodated by the system.

Figure 3:
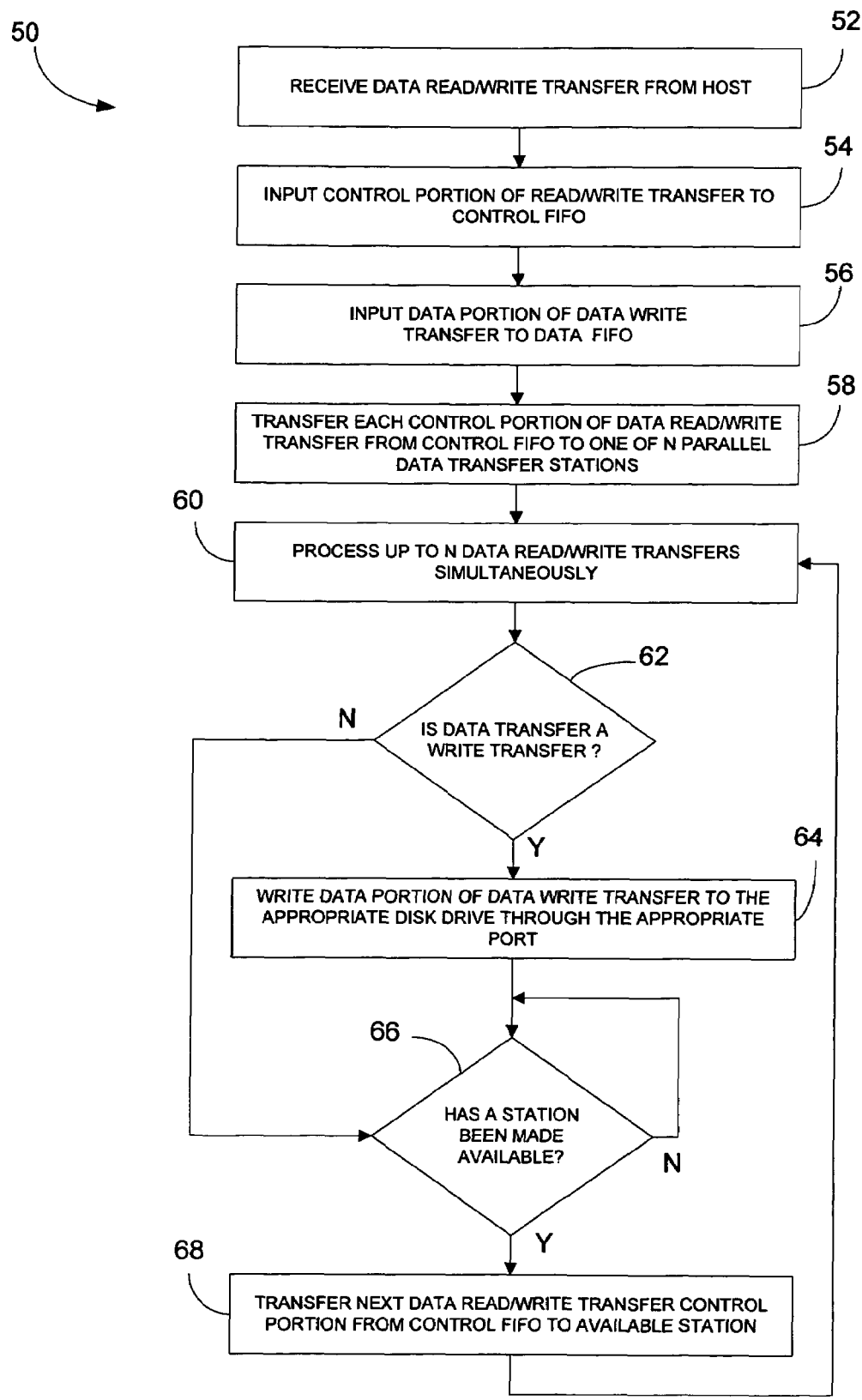
FIG. 3 is a flow diagram showing the steps carried out by the data transfer system according to the present invention.

The operation of the data transfer system 10 will be described with reference to FIG. 3, which is a flow diagram 50 showing the steps carried out in the data transfer system 10. In Step 52, data read transfers and data write transfers are received from the host by the data link 12. The control portion or header of the data read transfers and data write transfers are input to control FIFO 16A, Step 54, and the data portion or payload of the data write transfers are input to data FIFO 16B, Step 56. As shown in FIG. 2A, control FIFO 16A contains the control portions of data write transfer 22 and data read transfers 24-32, and data FIFO 16B contains the data portion or payload 34 associated with the data write transfer control portion 22, which includes data words DATA1-DATA8. In the preferred embodiment, the control portion or header of each data read transfer and data write transfer is one 32-bit word, while the data portion of each data write transfer contains up to eight 32 bit words. It will be understood, however, that the control portions and data portions of the data read transfers and data write transfers may be any size necessary for carrying out the read and write functions associated with the disk drive system. Furthermore, the depth of each FIFO 16A and 16B may vary, depending on the storage needs of the particular disk drive system with which the data transfer system 10 is used.

In Step 58, each of the control portions of the first N data read transfers and data write transfers stored in the control FIFO 16A are transferred into one of the data transfer processing stations 20A-20N through output register 18. In the example of FIG. 2A, assuming that the system 10 includes 4 data transfer processing stations, each of the control portions of data write transfer 22 and data read transfers 24-28 are transferred into one of the data transfer processing stations 20A-20N. As shown in FIG. 2B, the control portion WRITE of data write transfer 22 is shown transferred to data transfer processing stations 20A, the control portion READ of data read transfer 24 is shown transferred to data transfer processing stations 20B, the control portion READ of data read transfer 26 is shown transferred to data transfer processing stations 20C, and the control portion READ of data read transfer 28 is shown transferred to data transfer processing stations 20N. The control portions READ of data read transfers 30 and 32 are shown shifted down in control FIFO 16A and subsequent data read transfers are shown as being transferred into control FIFO 16A through data link 12.

In Step 60, the data write transfer 22 and data read transfers 24-28 are simultaneously processed by data transfer processing stations 20A-20N. Since the data transfer being processed in the data transfer processing station 20A is a data write transfer, the data portion of the data write transfer, stored in data FIFO 16B, is transferred directly to the multi-port access architecture 14 through output register 18 and written to the disk drive (not shown), Step 62. After the transfer, or if the data transfer is a data read transfer, Step 62, the process proceeds to Step 66, where the system 10 remains in a loop waiting for one of the data transfer processing stations to complete its transfer and become available for the next transfer. When a data transfer processing station becomes available, the next control portion stored in control FIFO 16A is transferred to the available data transfer processing station. As shown in FIG. 2C, when data transfer processing station 20B completes data read transfer 24 and becomes available, the next control portion stored in control FIFO 16A, READ 30 is transferred into data transfer processing station 20B to be processed, Step 60. The remaining control portions of data read transfers and data write transfers in control FIFO 16A and new data read transfers and data write transfers are shifted in the control FIFO 16A. For example, in an alternative embodiment, the data portion of a data write transfer may be transferred from the data FIFO 16B to the data transfer processing station 20A and then written to the disk drive in Step 62. In this embodiment, the data portion of a write transfer is removed from the data FIFO 16B, thus enabling subsequent write transfers to be processed through the next available data transfer processing station. However, the data transfer processing station would have to include enough memory to store the entire payload, rather than just the header, which is the case in the above-described embodiment. For example, if each payload associated with a data write transfer is 4 KB, in the case of N data transfer processing stations, the system would require 4 N KB of memory.

In an alternative embodiment, the data portion of a data write transfer may be transferred from the data FIFO 16B to the data transfer processing station 20A and then written to the disk drive in Step 62. In this embodiment, the data portion of a write transfer is removed from the data FIFO 16B, thus enabling subsequent write transfers to be processed through the next available data transfer processing station. However, the data transfer processing station would have to include enough memory to store the entire payload, rather than just the header, which is the case in the above-described embodiment. For example, if each payload associated with a data write transfer is 4 KB, in the case of N data transfer processing stations, the system would require 4 N KB of memory.

Accordingly, the data transfer system 10 includes a split-FIFO multi-station architecture which enables data read transfers and data write transfers between a host and a disk drive system to be processed more efficiently. The system includes a control FIFO for queuing control portions of data read transfers and data write transfers, which include the headers of the transfers, and a data FIFO for queuing the data included in the data write transfers. Multiple data transfer processing stations are coupled to the control and data FIFOs in a parallel configuration. In operation, the control portions of the data read transfers and data write transfers are transferred from the control FIFO into the data transfer processing stations. The data read transfers and data write transfers in the data transfer processing stations are then processed in a parallel manner. As soon as a data transfer processing station becomes available after processing a data read transfer or data write transfer, the next control portion stored in the control FIFO is transferred into that station for processing. Since the data portions of the data write transfers are stored in a separate FIFO from the control portions, and multiple data transfer processing stations are parallelly coupled between the FIFOs and the disk drive system, multiple consecutive data read transfers can be processed more efficiently without being slowed down by pending data write operations. Since multiple data read transfers and data write transfers are processed simultaneously, the overall performance of the disk drive system is boosted, and the "bottleneck" that occurred in the single FIFO of the prior art system is eliminated.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data transfer device for writing data to and reading data from a disk drive system through a plurality of ports of the data transfer device, the data transfer device comprising:
   a first buffer for serially receiving, from a host system, control portions of data read transfers and data write transfers;
   a second buffer for serially receiving, from the host system, data portions of data write transfers received by the first buffer; and
   N temporary storage devices coupled to the first buffer and the second buffer, N being a positive integer greater than 1, the N temporary storage devices for parallelly receiving and temporarily storing consecutive control portions of the data read transfers and data write transfers from the first buffer;
   wherein up to N of the data read transfers and data write transfers are transferred to the disk drive system through the plurality of ports simultaneously.

2. The data transfer device of claim 1 wherein the first and second buffers are FIFO buffers.

3. The data transfer device of claim 2 wherein, after each of the N temporary storage devices transfers a data read transfer or data write transfer and becomes available, a subsequent one of a data read transfer and data write transfer is transferred to each of the available N temporary storage devices from the first buffer.

4. A data transfer device for writing data to and reading data from a disk drive system, the data transfer device comprising:
   a first buffer for serially receiving, from a host system, control portions of data transfers;
   a second buffer for serially receiving, from the host system, data portions of data transfers received by the first buffer; and
   N data transfer processing stations, coupled to the first buffer, N being a positive integer greater than 1, the N data transfer processing stations for parallelly receiving and processing consecutive control portions of the data transfers from the first buffer;
   wherein up to N of the data transfer transfers are simultaneously processed by the data transfer processing stations.

5. The data transfer device of claim 4 wherein the first and second buffers are FIFO buffers.

6. The data transfer device of claim 5 wherein, after each of the N temporary storage devices transfers a data transfer and becomes available, a subsequent one of a data transfer is transferred to each of the available N temporary storage devices from the first buffer.

7. The data transfer device of claim 4 wherein data portions of data transfers queued in the second buffer are shifted out of the second buffer and written to a disk drive of the disk drive system upon its associated control portion being processed by one of the N data transfer processing stations.

8. The data transfer device of claim 4 wherein data portions of data transfers queued in the second buffer are shifted from the second buffer to the data transfer processing station processing its associated control portion and then written to a disk drive of the disk drive system.

9. A method of transferring data in a disk drive system comprising:
   A. receiving data transfers from a host system;
   B. queuing control portions of the data transfers in a first buffer;
   C. queuing data portions of the data transfers in a second buffer;
   D. shifting each of N control portions of the data transfers from the first buffer into one of N parallel data transfer stations, N being a positive integer greater than 1;
   E. processing the N control portions in the N parallel data transfer stations simultaneously; and
   F. shifting subsequent control portions of data transfers queued in the first buffer to ones of the N parallel data transfer stations that have completed a transfer of a previously stored control portion.

10. A data transfer device comprising:
    means for receiving data transfers from a host system;

means for queuing control portions of the data transfers in a first buffer;

means for queuing data portions of the data transfers in a second buffer;

means for shifting each of N control portions of the data transfers from the first buffer into one of N parallel data transfer stations, N being a positive integer greater than 1;

means for processing the N control portions in the N parallel data transfer stations simultaneously; and means for shifting subsequent control portions of data transfers queued in the first buffer to ones of the N parallel data transfer stations that have completed a transfer of a previously stored control portion.

* * * * *